United States Patent [19]

Yavnieli

[11] Patent Number: 4,490,937
[45] Date of Patent: Jan. 1, 1985

[54] INSECT ELECTROCUTION DEVICE

[75] Inventor: Mordechai Yavnieli, Ramat Hasharon, Israel

[73] Assignee: AMCOR Ltd., Tel Aviv, Israel

[21] Appl. No.: 509,460

[22] Filed: Jun. 30, 1983

Related U.S. Application Data

[63] Continuation-in-part of Ser. No. 424,304, Sep. 27, 1982.

[30] Foreign Application Priority Data

Dec. 7, 1981 [IL] Israel .................................... 64464
May 19, 1982 [IL] Israel .................................... 65825
Nov. 29, 1982 [IL] Israel .................................... 67364

[51] Int. Cl.³ .............................................. A01M 1/22
[52] U.S. Cl. ......................................... 43/112; 43/113
[58] Field of Search ...................... 43/112, 98, 99, 113

[56] References Cited

U.S. PATENT DOCUMENTS

| 1,985,921 | 1/1935 | Folmer | 43/112 |
|---|---|---|---|
| 2,468,227 | 4/1949 | Nagel | 43/113 |
| 2,608,022 | 8/1952 | Wright | 43/112 |
| 2,780,026 | 2/1957 | Dail et al. | 43/113 |
| 3,123,933 | 3/1964 | Roche | 43/113 |
| 3,319,374 | 5/1967 | Gawne | 43/113 |
| 4,109,408 | 8/1978 | Yavnieli | 43/112 |

FOREIGN PATENT DOCUMENTS 101667 8/1937 Australia .............................. 43/113

OTHER PUBLICATIONS

*Agricultural Engineering*, Jun. 1964, pp. 314-317, 332, J. P. Hollingsworth et al., "Radiant-Energy Attractants for Insects".
*Scientific American*, Jul. 24, 1915, "Traps for Electrocuting Insects".

Primary Examiner—Nicholas P. Godici
Assistant Examiner—P. Weston Musselman, Jr.
Attorney, Agent, or Firm—Cushman, Darby & Cushman

[57] ABSTRACT

An insect electrocution device comprising a lamp and an insect electrocution assembly disposed in generally surrounding relationship with at least a portion of the lamp. In particular, an insect electrocution device comprising a lamp for attracting insects and an insect electrocution assembly disposed about the lamp, the insect electrocution assembly comprising an outer apertured plate, the area of the apertures being substantially less than the remaining area of the plate, and inner electrode apparatus spaced from the outer apertured plate. There is also disclosed a combination illumination device and insect electrocution device including a lamp having peak outputs in both the UV region for insect attraction and in the visible region for effective illumination.

17 Claims, 6 Drawing Figures

INSECT ELECTROCUTION DEVICE

This application is a continuation-in-part of application Ser. No. 424,304, filed Sept. 27, 1982.

FIELD OF THE INVENTION

The present invention relates to insect electrocution devices generally.

BACKGROUND OF THE INVENTION

Various types of insect electrocution devices are known both in the patent literature and in the marketplace. Most of the insect electrocution devices presently in use employ an ultraviolet lamp, typically of the fluorescent type, for attracting insects to the vicinity of the electrocution region. One type of insect electrocution device using an ultraviolet lamp is described in applicants' U.S. Pat. No. 4,109,408.

SUMMARY OF THE INVENTION

The present invention seeks to provide an insect electrocution device which provides greatly enhanced insect killing efficiency as compared with conventional devices.

There is thus provided in accordance with an embodiment of the present invention, an insect electrocution device comprising a lamp and an insect electrocution assembly disposed in generally surrounding relationship with at least a portion of the lamp.

According to a preferred embodiment of the invention, the lamp is a UV fluorescent lamp having a peak output at 320 nm and a typical output range of 300–350 nm, or comprises a mercury vapor lamp or an infra-red lamp.

Further in accordance with an embodiment of the present invention there is provided an insect electrocution device comprising a lamp for attracting insects and an insect electrocution assembly disposed about the lamp, the insect electrocution assembly comprising an outer apertured plate, the area of the apertures being substantially less than the remaining area of the plate, and inner electrode apparatus spaced from the outer apertured plate.

Additionally in accordance with an embodiment of the invention, there is provided a combination illumination device and insect electrocution device comprising a lamp having peak outputs in both the UV region for insect attraction and in the visible region for effective illumination, and an insect electrocution assembly disposed about the lamp.

Further in accordance with an embodiment of the present invention the insect electrocution assembly is surrounded by insulative grid means preventing the fingers of a user from engaging electrically conductive portions of the insect electrocution assembly.

In accordance with a preferred embodiment of the present invention, the outer apertured plate is grounded or floating and the inner electrode apparatus is disposed other than in a direct line behind the apertures, such that the apertured plate functions as a safety shield, and it is impossible for a human to touch the inner electrode.

In accordance with one preferred embodiment of the invention, the insect electrocution assembly is disposed in generally surrounding relationship with a first portion of the lamp and is arranged such that a second portion of the lamp is generally exposed so as to provide radiation to the surrounding region generally unimpeded by the insect electrocution assembly. There is thus provided a device with high insect killing efficiency which also functions as an efficient source of light and/or heat. Applications of an insect elctrocution device in accordance with the present invention include, for example, domestic and industrial applications where both insect control and the provision of heat and/or light is required. Agricultural applications such as pig sties and chicken brooders which combine the two requirements of insect control and heat and light provision are also envisioned.

BRIEF DESCRIPTION OF THE DRAWINGS

The present invention will be more fully understood and appreciated from the following detailed description taken in conjunction with the drawings in which.

DETAILED DESCRIPTION OF THE INVENTION

Figure 1:
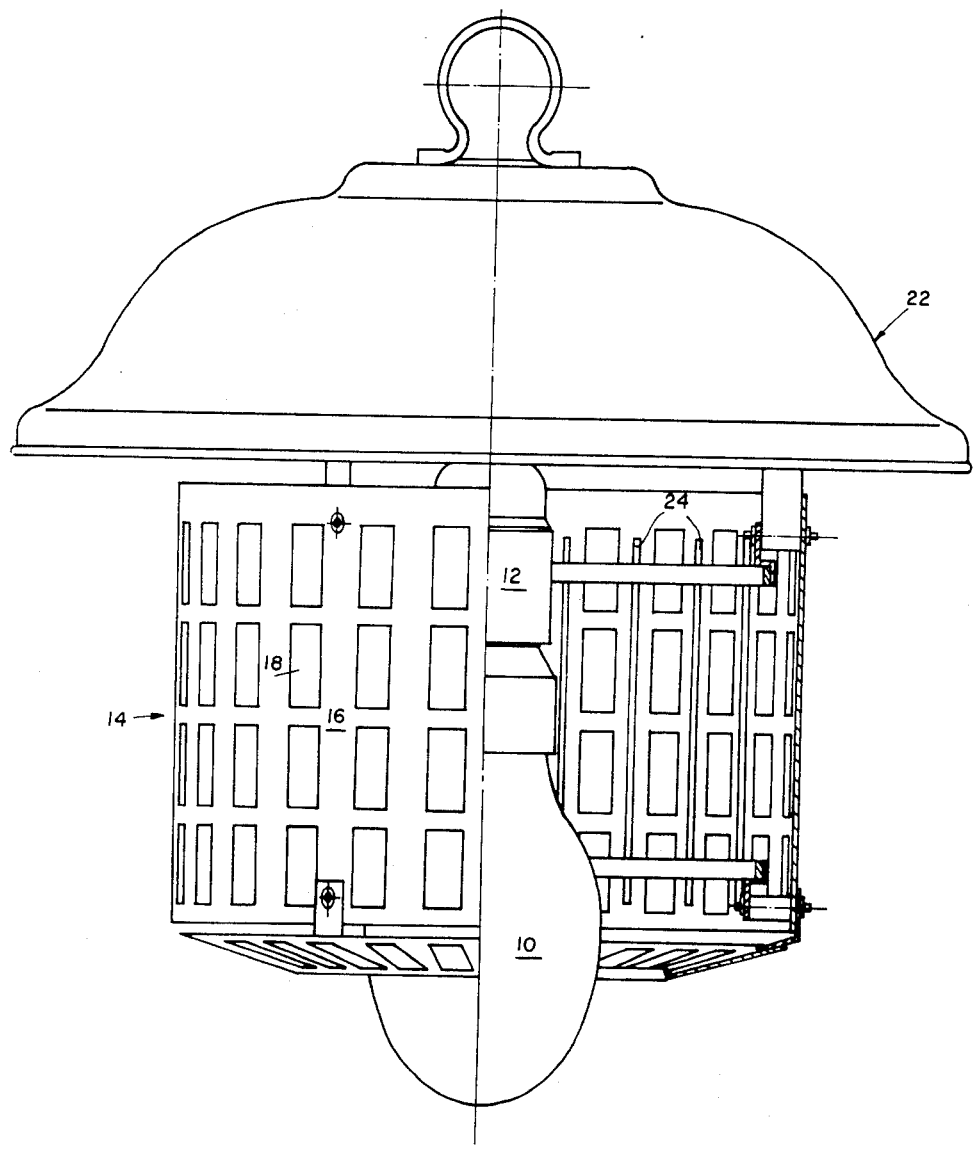
FIG. 1 is a partially cut away side view illustration of insect electrocution apparatus constructed and operative in accordance with an embodiment of the present invention.
Figure 2:
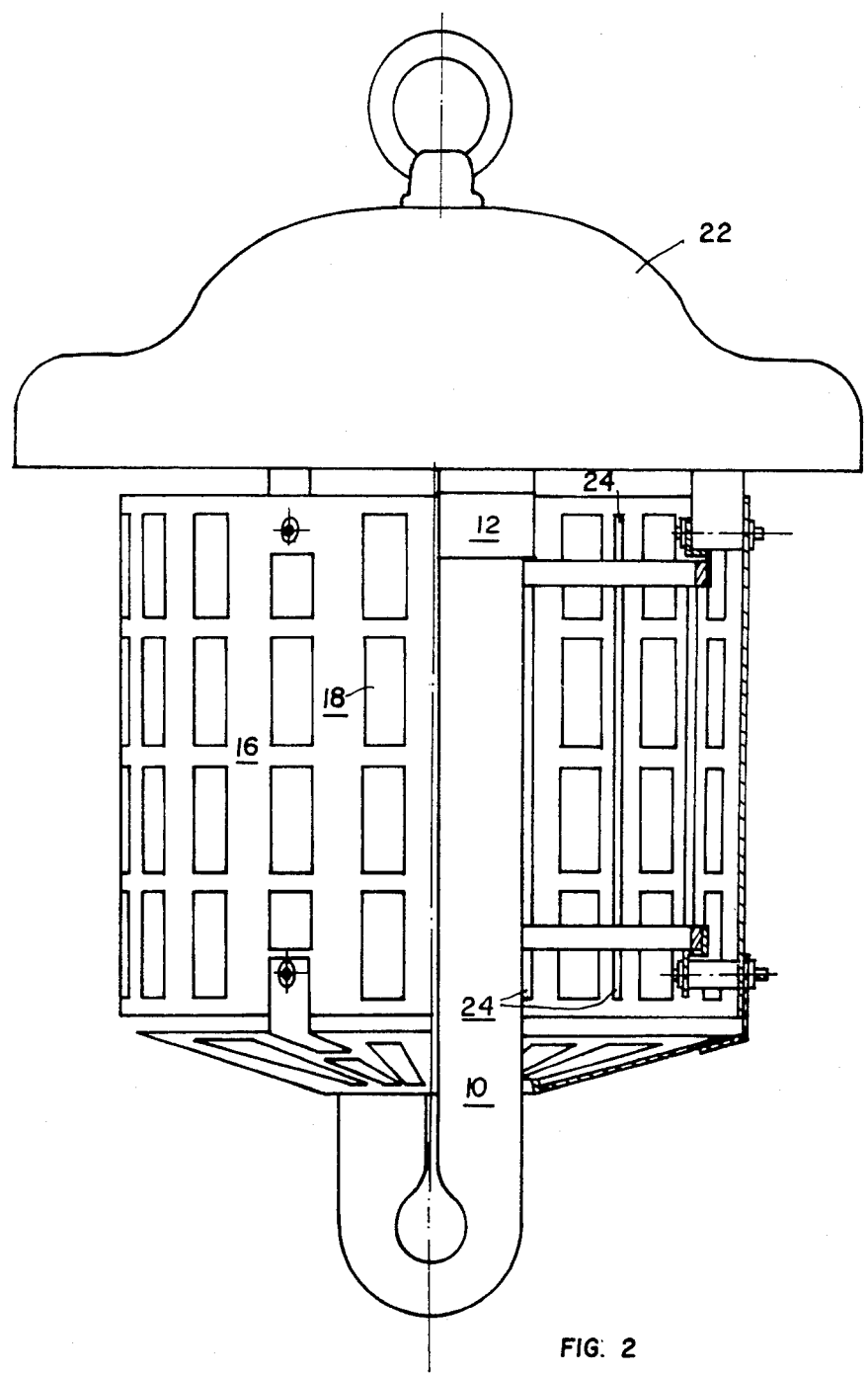
FIG. 2 illustrates an alternate embodiment of the apparatus of FIG. 1.

Reference is made to FIGS. 1 and 2 which illustrate a preferred embodiment of the present invention. The illustrated embodiment is designed for residential use and is merely exemplary of a wide range of possible designs also suitable for other uses such as industrial, institutional and agricultural.

The insect electrocution apparatus of FIGS. 1 and 2 comprises a lamp 10 which is connected to a source of electrical power and supported in a standard lamp socket 12. It is a particular feature of the present invention that lamp 10 provides a high level of radiation in a form required by a particular application. Illustrated in FIG. 1, lamp 10 is a mercury vapor lamp which produces high intensity light. According to another preferred embodiment of the present invention illustrated in FIG. 1, lamp 10 is an infra-red lamp which produces a high level of radiation in the infra-red range for heating. Any other suitable type of high output lamp may alternatively be employed. It is preferred to use a type of lamp which does not require a ballast for actuation, but this is not strictly required.

According to a preferred embodiment of the invention, the lamp is a UV fluorescent lamp having a peak output at 320 nm and a typical output range of 300–350 nm.

Disposed about the top portion of lamp 10 is an insect electrocution assembly 14 which comprises an outer peripheral plate element 16 of generally cylindrical configuration. Plate element 16 is formed with a regular pattern of apertures 18 which are arranged so as to permit insect ingress to the region within plate element 16. According to a preferred embodiment of the invention, the apertures are arranged in vertical rows which define solid strips 20 of plate element intermediate vertical rows of apertures 18. Plate element 16 is supported by a support mechanism (not shown) and fixed to the housing 22 of the device.

Disposed interiorly of plate element 16 and mounted in spaced electrically insulated relationship therefrom is an array 24 of vertical electrodes coupled to a source of electrical potential which contains a non-zero component of voltage. It is a particular feature of the present invention that the electrodes of array 24 are disposed rearwardly of solid strips 20 of plate element 16 and thus not radially inward along a direct line from apertures 18. Thus plate element 16 functions as a safety shield for the device and no additional safety shield is required. A further advantage of this construction is that the area in which the insects are electrocuted, i.e. between the two electrodes, is hidden from outside view and thus provides a more aesthetic appearance for the device.

Peripheral plate element 16 can be grounded. Alternatively, it may be connected to an isolating transformer and have a floating potential. It is a particular feature of the invention that the configuration of insect electrocution assembly 14 is such that it is impossible for a human or animal appendage to simultaneously contact electrode array 24 and plate element 16.

It is a particular feature of this embodiment of the insect electrocution device of the present invention that a significant portion of the lamp 10, in the illustrated embodiment, the lower portion thereof, is not obscured by the electrocution assembly 14. Due to this constructional feature, the device illustrated in FIG. 1 has a dual function, as a radiation source and as an insect electrocution device. Thus the electrocution device of the present invention may be installed in applications where illumination or heating is ordinarily required and also provide insect electrocution.

It is another particular feature of the present invention that the insect electrocution assembly device is an effective trap for insects entering through apertures 18 due in part to the fact that the apertures are relatively small as compared with the non-apertured area of cylinder plate element 16. This feature enhances the insect killing efficiency of the device.

It is noted that due to the heating of the electrocution assembly 14 by the lamp 10, black body radiation in the non-visible range including particularly the frequency range of 310–350 nm, which is known to attract insects, is provided. Furthermore, the high level of heat generated by the lamp 10, which is typically of at least 150 watt capacity, operates as well to attract insects.

The electrical connections of the outer plate element 16 and of the hot electrode array 24 are entirely conventional and need not be described herein. Any suitable type of electrical current, AC or DC may be applied across the electrodes for electrocuting insects therebetween.

Figure 3:
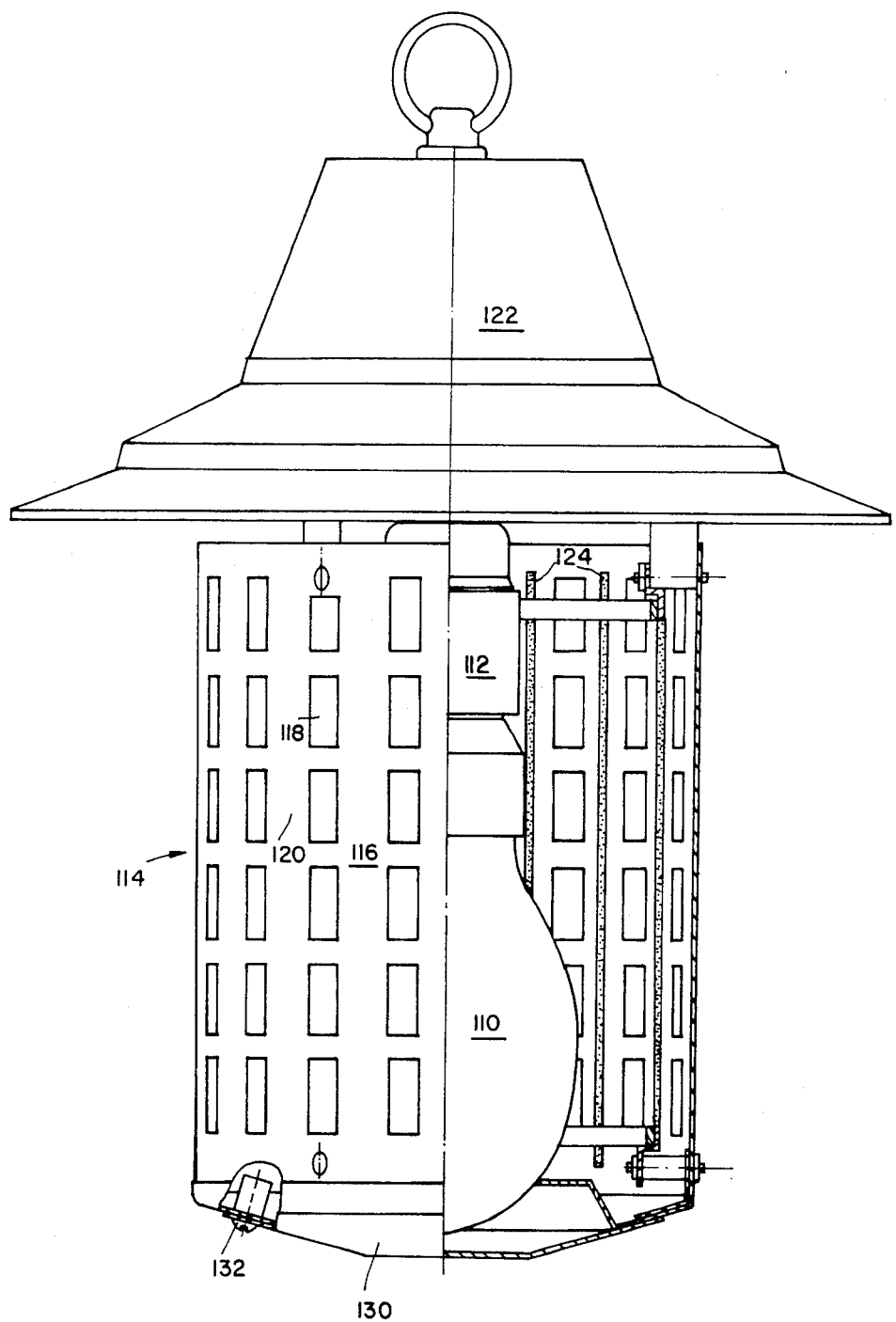
FIG. 3 is a partially cut away side view illustration of insect electrocution apparatus constructed and operative in accordance with an alternate embodiment of the present invention.
Figure 4:
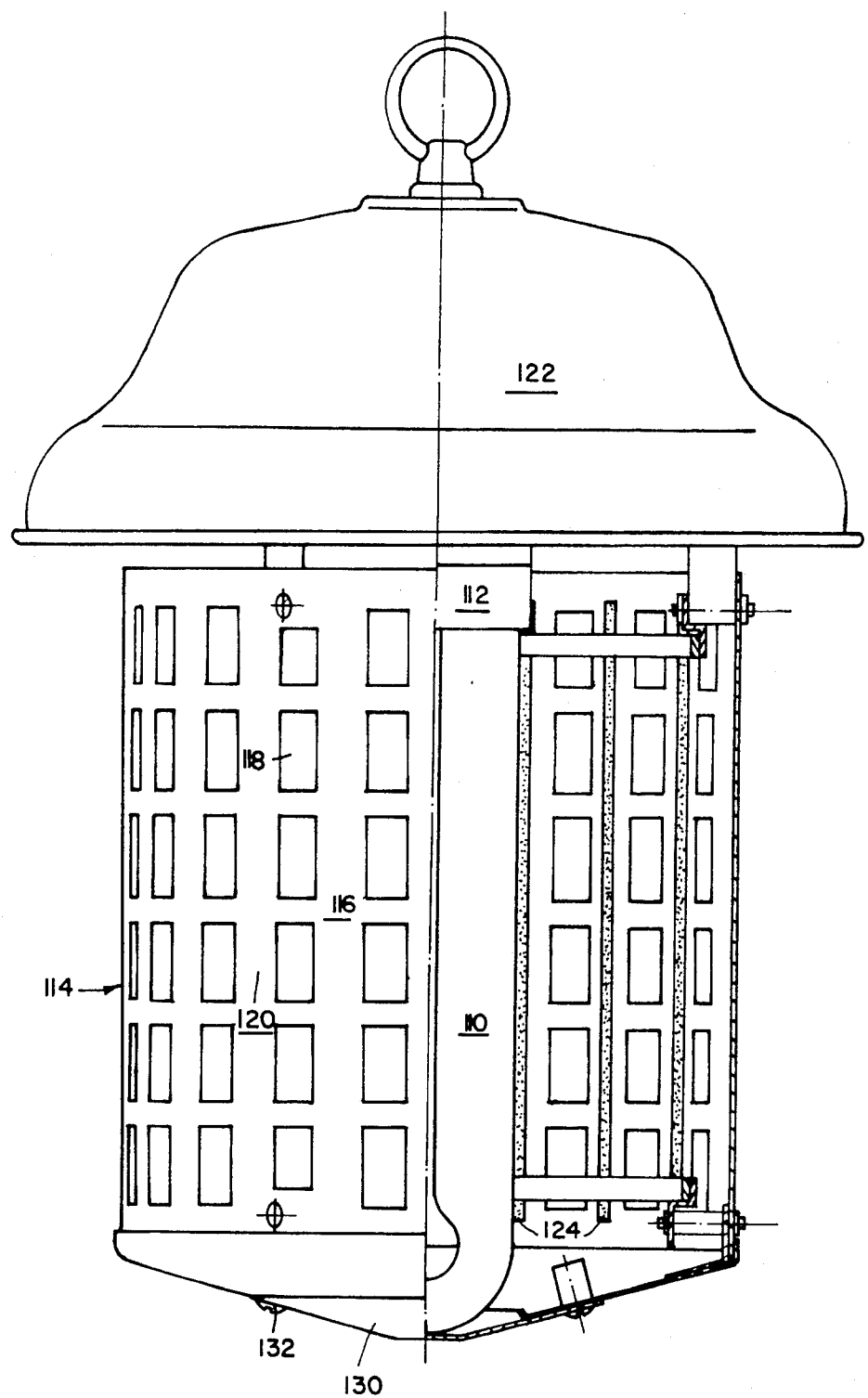
FIG. 4 illustrates an alternate embodiment of the apparatus of FIG. 3.

FIGS. 3 and 4 illustrate another preferred embodiment of the device of the present invention. Similarly to FIGS. 1 and 2, FIGS. 3 and 4 comprise a lamp 110 which is connected to a source of electrical power and supported in a standard lamp socket 112. FIG. 3 illustrates the use of a mercury vapor lamp while FIG. 4 illustrates the use of an infra-red lamp in this embodiment of the invention.

Disposed about substantially the entire lamp 10 is an insect electrocution assembly 114 which is in all respects similar to that described in connection with FIG. 1. It comprises an outer peripheral plate element 116 of generally cylindrical configuration, formed with a regular pattern of apertures 118 which are arranged so as to permit insect ingress to the region within plate element 16. The lower portion of insect electrocution assembly 114 is provided with a cover 130 affixed thereto as by screws 32. Cover 130 provides additional protection from accidental burning by coming in contact with lamp 10 yet is easily removable for periodic replacement of lamp 10 and cleaning of the interior of insect electrocution assembly 114.

It is a particular feature of this embodiment of the present invention that the insect electrocution assembly device is a particularly effective trap for insects entering through apertures 118. The fact that the assembly device is closed both at the top and at the bottom, in addition to the fact that the apertures are relatively small as compared with the non-apertured area of cylinder plate element 116, enhances the insect killing efficiency of the device.

It is also a particular feature of this embodiment of the invention that dead insects are caught by cover 130 and retained within the assembly device rather than falling therefrom.

Figure 5:
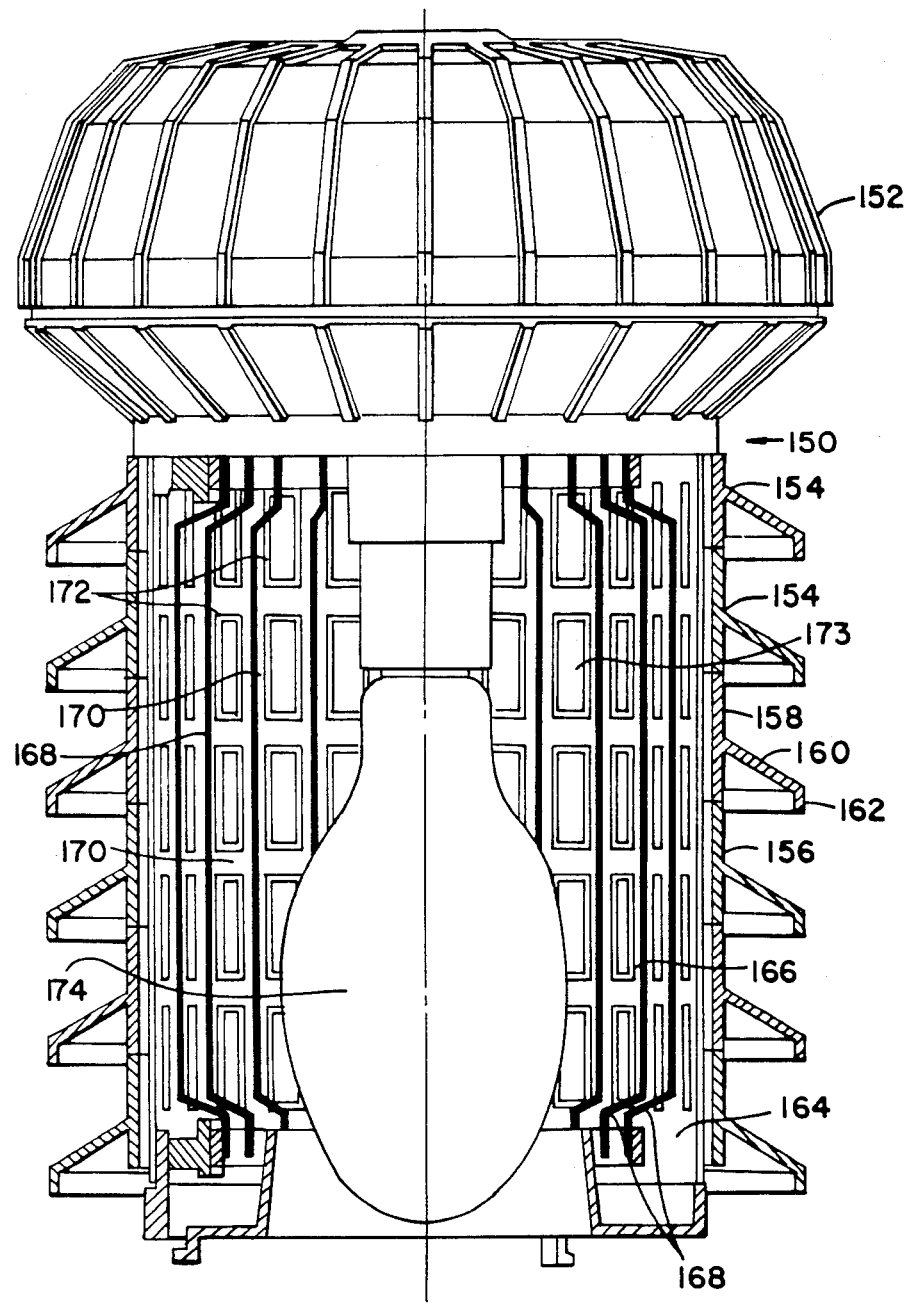
FIG. 5 is a partially cut away side view illustration of insect electrocution apparatus constructed and operative in accordance with a further alternate embodiment of the present invention.

Reference is now made to FIG. 5 which is an illustration, in partially cut away form, of a combination illumination and insect electrocution device. The illustrated illumination and insect electrocution device comprises a housing 150 formed of an insulating material such as high strength plastic and including a top portion 152 which encloses electrical circuitry and power supplies (not shown). Disposed below top portion 152 are a series of apertured modular grid ring elements 154 which together define a body portion 156 of the housing.

Grid ring elements 154 each comprise a generally cylindrical ring portion 158 from which extends an inclined circumferential portion 160 which terminates in a second ring portion 162. Grid ring element 154 are joined together by bonding or by any other suitable technique and together define a shade which directs illumination generally outwardly and downwardly from the housing 150.

Disposed interiorly of body portion 156 is an apertured outer peripheral plate element 164 which may be similar in all relevant respects to outer peripheral plate element 16 described hereinabove in connection with FIG. 1. Disposed interiorly of plate element 164 and mounted in spaced electrically insulated relationship therefrom is an array 166 of vertical electrodes 168 coupled to a source of electrical potential, such that a voltage difference is defined across the gap between element 164 and array 166. Preferably the individual electrodes 168 are each disposed rearwardly of solid strips 170 of plate element 164 and thus not radially inward along a direct line from apertures 172 defined in plate element 164. This need not be the case, however.

Grid ring elements 154 are formed to define, when joined in a stacked relationship, an array of apertures 173 which are generally aligned with apertures 172 in plate element 164 but are smaller than those apertures. The dimensions of apertures 173 are such as to prevent the standard Test Finger, whose configuration is established in Publication 65 of th I.E.C. (International Electromechanical Commission) and is generally of maximum diameter 12 mm with truncated sides, from reaching plate element 164.

A lamp 174 is disposed interiorly of array 166. According to a preferred embodiment of the present invention, the lamp has illumination characteristics which provide peak illumination outputs both in the UV range, preferably in the vicinity of 360 nm and in the visible range at about 55 nm. Thus the lamp provides efficient ordinary visible light illumination of an array while at the same time emitting UV radiation at a peak wavelength which is effective to attract insects for electrocution thereof. A lamp which satisfies these specifications is a mercury vapor lamp manufactured by Phillips Ltd. of the U.K. Other suitable light sources may alternatively be used.

Figure 6:
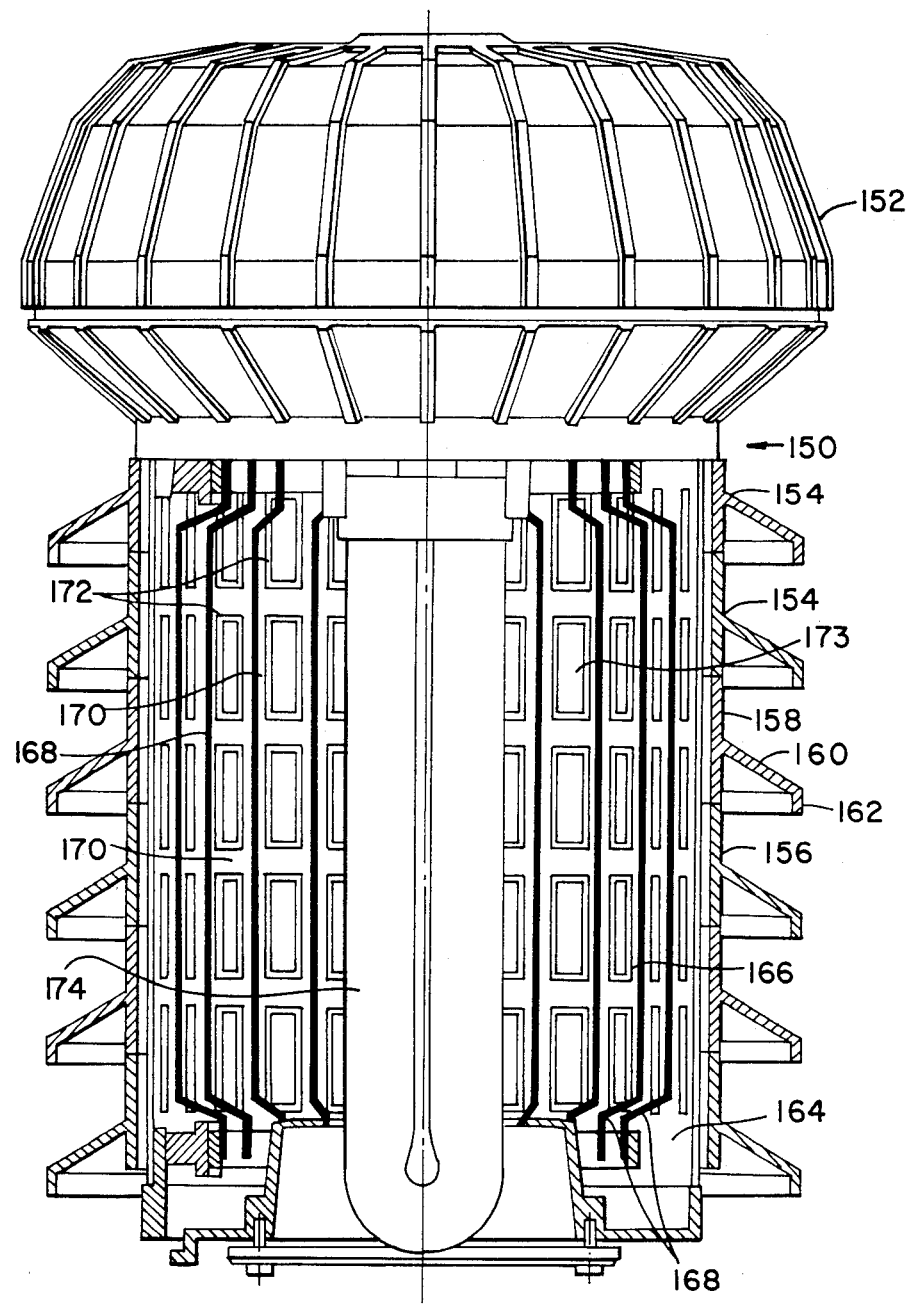
FIG. 6 is a partially cut away side view illustration of insect electrocution apparatus constructed and operative in accordance with a further alternative embodiment of the present invention.

FIG. 6 illustrates an embodiment similar to that of FIG. 5 employing a fluorescent light bulb.

It will be appreciated that FIGS. 1 to 6 merely illustrate representative embodiments of the electrocution device of the present invention. The design of the most suitable embodiment will depend upon the desired location and use in each case.

It will further be appreciated by those skilled in the art that the present invention is not limited by what has been particularly shown and described hereinabove. Rather the scope of the present invention is defined only by the claims which follow.

I claim:

1. Insect electrocution apparatus comprising:

means for producing radiant energy for attracting insects; and an insect electrocution assembly disposed about said radiant energy producing means and including:

an outer electrode comprising a generally cylindrical grid having defined thereon a plurality of apertures separated by axially disposed continuous solid strips for permitting said radiant energy to pass outwardly therethrough and to permit insects to pass inwardly therethrough;

an array of elongate, axially disposed inner electrodes disposed radially inward of said solid strips and arranged to lie other than radially inward of said apertures, the arrangement of said inner electrodes and said solid strips defining an insect electrocution region at the radially extending gap between said inner electrodes and said solid strips which is hidden from outside view by said solid strips, and such that dead insects falling from said electrocution region remain inside said outer electrode, the total area of the apertures in the outer electrode being relatively small as compared with the non-apertured area thereof, thereby to define an insect trap;

an outer shading grid made of an insulating material and comprising a plurality of stacked, discrete, identical ring elements, each comprising a generally cylindrical inner ring portion from which extends an inclined circumferential portion which terminates in a second outer ring portion; and means for applying a voltage separation across said outer electrode and said array of inner electrodes sufficient to permit electrocution of insects located therebetween.

2. Insect electrocution apparatus according to claim 1 and wherein said apertures are sized and disposed with respect to said array of inner electrodes such that said inner electrodes are not readily engageable by a human finger inserted through an aperture.

3. Insect electrocution apparatus according to claim 2 and wherein said apparatus does not comprise any additional protective grid exterior of said outer electrode.

4. Insect electrocution apparatus according to claim 1 and wherein said outer electrode is grounded.

5. Insect electrocution apparatus according to claim 1 and wherein said outer electrode is coupled to an insolating transformer and has a floating potential.

6. Insect electrocution apparatus according to claim 2 and wherein said outer electrode is coupled to an isolating transformer and has a floating potential.

7. Insect electrocution apparatus according to claim 3 and wherein said outer electrode is coupled to an isolating transformer and has a floating potential.

8. Insect electrocution apparatus according to claim 1 and wherein said means for producing radiant energy comprises illuminating means which is operative to illuminate an enclosure sufficiently so as to eliminate the need for a source of conventional illumination.

9. Insect electrocution apparatus according to claim 2 and wherein said means for producing radiant energy comprises illuminating means which is operative to illuminate an enclosure sufficiently so as to eliminate the need for a source of conventional illumination.

10. Insect electrocution apparatus according to claim 3 and wherein said means for producing radiant energy comprises illuminating means which is operative to illuminate an enclosure sufficiently so as to eliminate the need for a source of conventional illumination.

11. An insect electrocution device according to claim 1 and wherein said means for producing radiant energy for attracting insects comprises a lamp.

12. An insect electrocution device according to claim 11 and wherein said insect electrocution assembly is disposed in generally surrounding relationship with the whole of said lamp.

13. An insect electrocution device according to claim 1 and wherein said lamp comprises a mercury vapor lamp.

14. An insect electrocution device according to claim 1 and wherein said lamp comprises an infra-red lamp.

15. An insect electrocution device according to claim 1 and wherein the arrangement of said inner electrodes behind said solid strips renders said inner electrodes not normally engageable by a human appendage extending through said apertures.

16. A device according to claim 1 and wherein said shading grid defines a plurality of apertures sized to prevent a standard Test Finger from extending therethrough.

17. An insect electrocution device according to claim 1 and wherein the apertures formed on said outer plate are arranged in vertical rows separated by solid strips of said outer plate and wherein said inner electrode apparatus comprises a plurality of electrodes arranged behind said solid strips and thus not normally engageable by a human appendage extending through said apertures.

* * * * *